(12) United States Patent
Zamora Duran et al.

(10) Patent No.: US 10,771,573 B2
(45) Date of Patent: Sep. 8, 2020

(54) AUTOMATIC MODIFICATIONS TO A USER IMAGE BASED ON COGNITIVE ANALYSIS OF SOCIAL MEDIA ACTIVITY

(71) Applicant: INTERNATIONAL BUSINESS MACHINES CORPORATION, Armonk, NY (US)

(72) Inventors: Edgar A. Zamora Duran, Heredia (CR); Ninad Sathaye, Pune (IN); Clifford A. Pickover, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 161 days.

(21) Appl. No.: 16/003,737

(22) Filed: Jun. 8, 2018

(65) Prior Publication Data

US 2019/0379750 A1 Dec. 12, 2019

(51) Int. Cl.
*H04L 29/08* (2006.01)
*G06N 5/02* (2006.01)
*G06T 11/60* (2006.01)
*H04L 12/58* (2006.01)

(52) U.S. Cl.
CPC ........... *H04L 67/22* (2013.01); *G06N 5/02* (2013.01); *G06T 11/60* (2013.01); *H04L 51/046* (2013.01); *H04L 51/32* (2013.01); *H04L 67/306* (2013.01)

(58) Field of Classification Search
CPC ....... H04L 67/22; H04L 67/306; H04L 51/32; H04L 51/046; G06F 16/50; G06N 5/02; G06Q 50/01; G06T 11/60

USPC .......................................................... 709/206
See application file for complete search history.

(56) References Cited

U.S. PATENT DOCUMENTS

| 6,931,147 | B2 | 8/2005 | Colmenarez et al. |
| 7,908,554 | B1* | 3/2011 | Blattner ............... G06Q 10/107 715/706 |
| 8,738,553 | B1 | 5/2014 | Leung et al. |
| 8,867,849 | B1 | 10/2014 | Kirkham et al. |
| 9,158,857 | B2 | 10/2015 | Preetham et al. |
| 9,275,420 | B1 | 3/2016 | Fredinburg et al. |
| 9,331,970 | B2 | 5/2016 | Yuen et al. |
| 9,577,963 | B2 | 2/2017 | Dowdell |
| 9,817,625 | B1* | 11/2017 | Chun .................. G06F 16/5866 |
| 2005/0223328 | A1* | 10/2005 | Ashtekar ............. H04N 21/235 715/706 |

(Continued)

OTHER PUBLICATIONS

Mell et al., "The NIST Definition of Cloud Computing", NIST, Special Publication 800-145, Sep. 2011, 7 pages.

(Continued)

*Primary Examiner* — Ruolei Zong
(74) *Attorney, Agent, or Firm* — William Hartwell; Andrew D. Wright; Roberts Calderon Safran & Cole, P.C.

(57) ABSTRACT

A computer-implemented method comprising: determining, by a computing device, characteristics of a social media message; selecting, by the computing device, a particular image, of a plurality of images, based on the characteristics of the social media message and characteristics of the particular image; and outputting, by the computing device, information identifying the selected image to incorporate the selected image in a user's social media profile.

20 Claims, 8 Drawing Sheets

(56) References Cited

U.S. PATENT DOCUMENTS

| | | | |
|---|---|---|---|
| 2007/0097420 A1* | 5/2007 | Shah | G06F 16/58 358/1.15 |
| 2009/0031003 A1 | 1/2009 | Velarde | |
| 2009/0074306 A1* | 3/2009 | Liu | G06F 16/583 382/229 |
| 2009/0076800 A1* | 3/2009 | Li | G06F 17/241 704/10 |
| 2009/0327923 A1 | 12/2009 | Walker et al. | |
| 2012/0150592 A1 | 6/2012 | Govrik et al. | |
| 2014/0040775 A1 | 2/2014 | Stoop et al. | |
| 2014/0047369 A1 | 2/2014 | Schiller | |
| 2014/0074620 A1 | 3/2014 | Bosworth et al. | |
| 2014/0156762 A1 | 6/2014 | Yuen et al. | |
| 2014/0157153 A1* | 6/2014 | Yuen | A63F 13/537 715/758 |
| 2015/0222586 A1 | 8/2015 | Ebersman et al. | |
| 2015/0381534 A1 | 12/2015 | Morris et al. | |
| 2019/0163333 A1* | 5/2019 | Kogan | G06F 3/0484 |

OTHER PUBLICATIONS

Mahmud, "IBM Watson Personality Insights: The science behind the service", https://developer.ibm.com/watson/blog/2015/03/23/ibm-watson-personality-insights-science-behind-service, IBM, Mar. 23, 2015, 5 pages.

Kelley, "IBM Researcher Can Build a Detailed Personality Profile of You Based on 200 Tweets", http://www.businessinsider.in/IBM-Researcher-Can-Build-A-Detailed-Personality-Profile-Of-You-Based-On-200-Tweets/articleshow/23989736.cms, Business Insider India, Oct. 11, 2013, 2 pages.

Bates, "The dress that changes colour to reflect your mood", http://www.dailymail.co.uk/femail/article-502889/The-dress-changes-colour-reflect-mood.html, Dec. 19, 2007, Daily Mail, 2 pages.

* cited by examiner

AUTOMATIC MODIFICATIONS TO A USER IMAGE BASED ON COGNITIVE ANALYSIS OF SOCIAL MEDIA ACTIVITY

BACKGROUND

The present invention generally relates to automatically modifying a user image and, more particularly, to automatically modifying a user image based on cognitive analysis of social media activity.

Social media are computer-mediated technologies that facilitate the creation and sharing of information, ideas, career interests and other forms of expression via virtual communities and networks. The variety of stand-alone and built-in social media services may include features such as: Interactive Web 2.0 Internet-based applications; User-generated content, such as text posts or comments, digital photos or videos, and data generated through all online interactions; User-created service-specific profiles for a social media platform; Development of online social networks by connecting a user's profile with those of other individuals or groups. Users typically access social media services via web-based technologies on desktop, computers, and laptops, or download services that offer social media functionality to their mobile devices (e.g., smartphones and tablet computers). When engaging with these services, users can create highly interactive platforms through which individuals, communities, and organizations can share, co-create, discuss, and modify user-generated content or pre-made content posted online.

SUMMARY

In an aspect of the invention, a computer-implemented method includes: a computer-implemented method comprising: determining, by a computing device, characteristics of a social media message; selecting, by the computing device, a particular image, of a plurality of images, based on the characteristics of the social media message and characteristics of the particular image; and outputting, by the computing device, information identifying the selected image to incorporate the selected image in a user's social media profile.

In an aspect of the invention, there is a computer program product for dynamically updating a user's social media profile based on characteristics of a newly posted social media message on the user's social media profile, the computer program product comprising a computer readable storage medium having program instructions embodied therewith, the program instructions executable by a computing device to cause the computing device to: obtain characteristics of the newly posted social media message via one or more cognitive computing techniques; obtain respective characteristics of a plurality of images associated with the user; score each of the plurality of images by comparing the respective characteristics of each of the plurality of images with the characteristics of the newly posted social media message; select a particular image, of the plurality of images, based on the scoring; and output information identifying the selected image to incorporate the selected image in the user's social media profile.

In an aspect of the invention, a system includes: a CPU, a computer readable memory and a computer readable storage medium associated with a computing device; program instructions to detect a trigger for incorporating an image in a user's social media profile based on a social media message posted to the user's social media profile; program instructions to determine characteristics of the social media message; program instructions to score each of a plurality of images associated with the user by comparing respective characteristics of each of the plurality of images with the characteristics of the social media message; program instructions to select a particular image, of the plurality of images, based on the scoring; and program instructions to output information identifying the selected image to incorporate the selected image in the user's social media profile. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
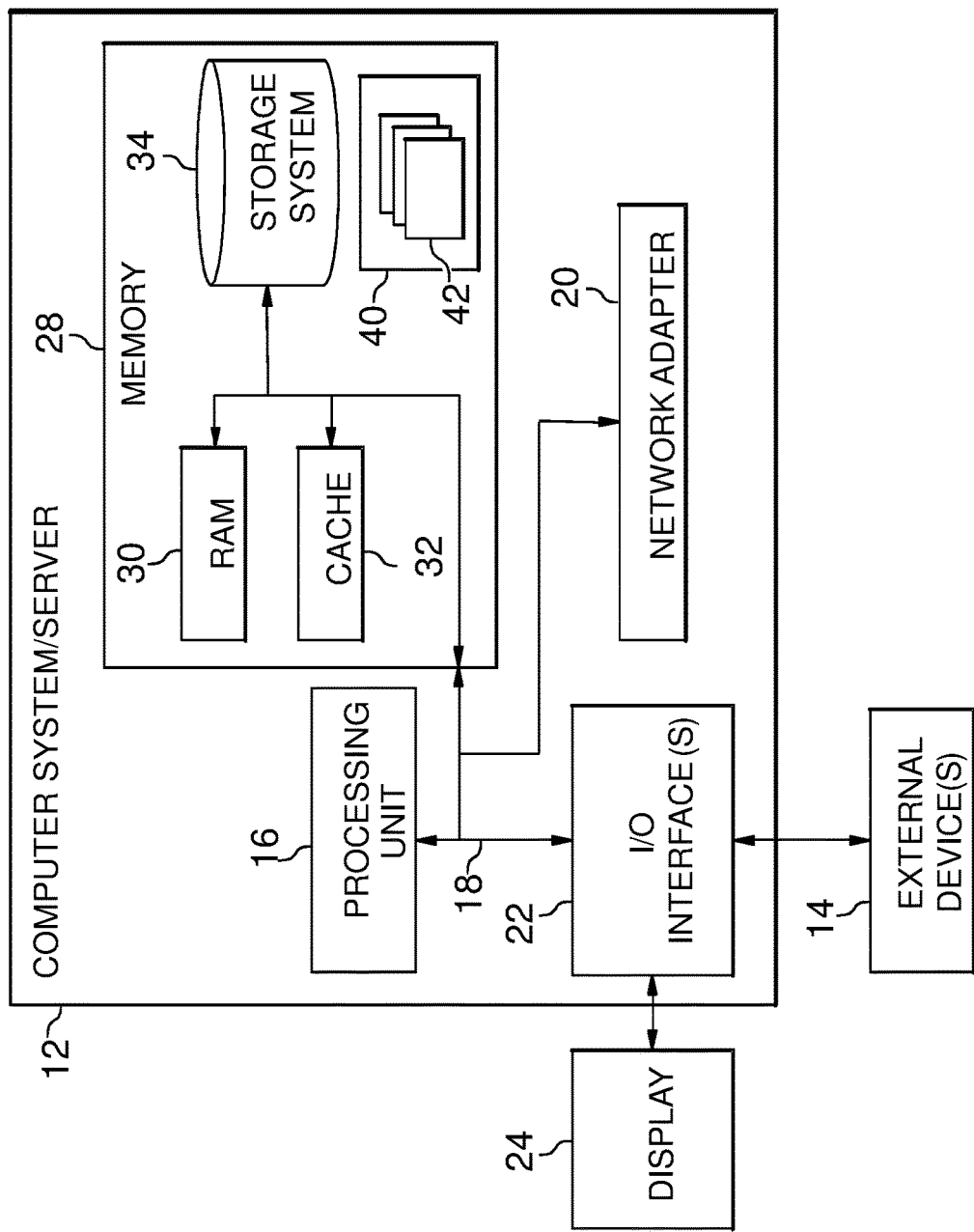
FIG. 1 depicts a cloud computing node according to an embodiment of the present invention.

The present invention generally relates to automatically modifying a user image and, more particularly, to automatically modifying a user image based on cognitive analysis of social media activity. Aspects of the present invention may analyze a user's social media activity (e.g., public posts, messages, etc.) and may incorporate a user image to the user's social media page that is best suited for the user's recently posted message (e.g., closely matches a sentiment, tone, personality, mood, etc. of the user's recently posted message). For example, aspects of the present invention may modify a user's profile picture, set a temporary profile picture, add a picture to the user's post, or incorporate an image to the user's social media posting or page in some other manner based on a cognitive analysis of the user's social media activity. In embodiments, aspects of the present invention may incorporate or modify a user's image by posting the image to the user's social media profile, selecting a different image that what is currently set, applying filters/lighting/special effects/background modifications to an image, superimposing text/graphics/logos/objects/drawings, cropping sections, incorporating the image to a collage of multiple different images, modifying objects (e.g., clothing) in the image, modifying facial expressions in the image, etc. As an illustrative, non-limiting example, a profile image of a user that has posted a distressing message may be changed from a profile image in which the user is appearing happy (e.g., by smiling) to an image in which the user appears distressed. In this way, the user's profile image may dynamically updated to the best-suited or most appropriate image based on the user's mood as determined by the characteristics of the user's postings on a social media platform.

As described herein, aspects of the present invention may incorporate an image based on an image control variable (ICV) which may include a set of characteristics that are extracted from a user's social media activity (e.g., social media post). For example, aspects of the present invention may apply cognitive computing techniques to identify characteristics of a user's social media post, such as tone, personality, mood, sentiment, etc. In embodiments, the set of characteristics may include, or may be determined based on natural language processing, cognitive computing, biometrics information gathered at the time a user posts a social media activity, geolocation information, voice analysis (e.g., when the social media activity includes audio), image/object analysis, etc. Aspects of the present invention may incorporate an image to a social media profile (e.g., by adding the image or replacing an existing image in the social media profile) based on the set of characteristics and/or weighted criteria that may be used to score candidate images to incorporate. As described herein, the scores may indicate a degree to which the candidate images match the tone, personality, mood, sentiment, and/or other characteristics of the user's social media post). In embodiments, an image may be selected from a repository of user images uploaded by the user. Additionally, or alternatively, user images may be accessed from other sources. Further, aspects of the present invention may be applied to a group of users based on the characteristics of messages posted by the group of users. In embodiments, aspects of the present invention may incorporate other media in addition to, or instead of, an image based on the characteristics of a message. For example, aspects of the present invention may incorporate a video or audio clip that is best suited for a posted message.

As described herein, aspects of the present invention provide improvements to the field of social media. Further, as described herein, aspects of the present invention are incorporated using particular machines having specific modules and repositories that carry out the functions of one or more aspect so the present invention. Aspects of the present invention may analyze user images that may be stored across multiple distributed repositories, and select the best-suited image(s) and/or modify images in the most appropriate manner based on a set of characteristics associated with a user's post. That is, hundreds, or potentially thousands of user images may be analyzed in a matter of seconds, which cannot be done with pen and paper.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
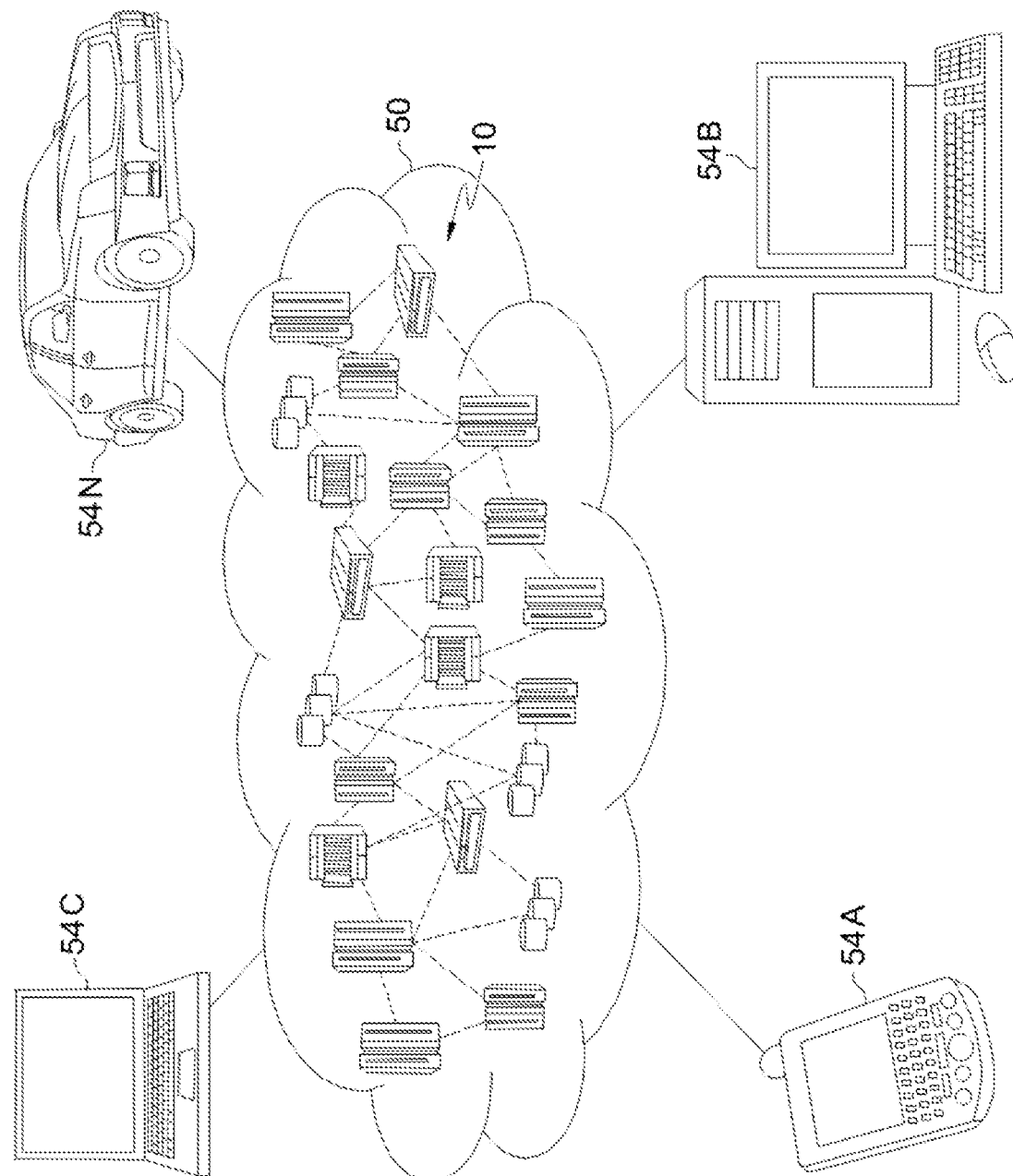
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
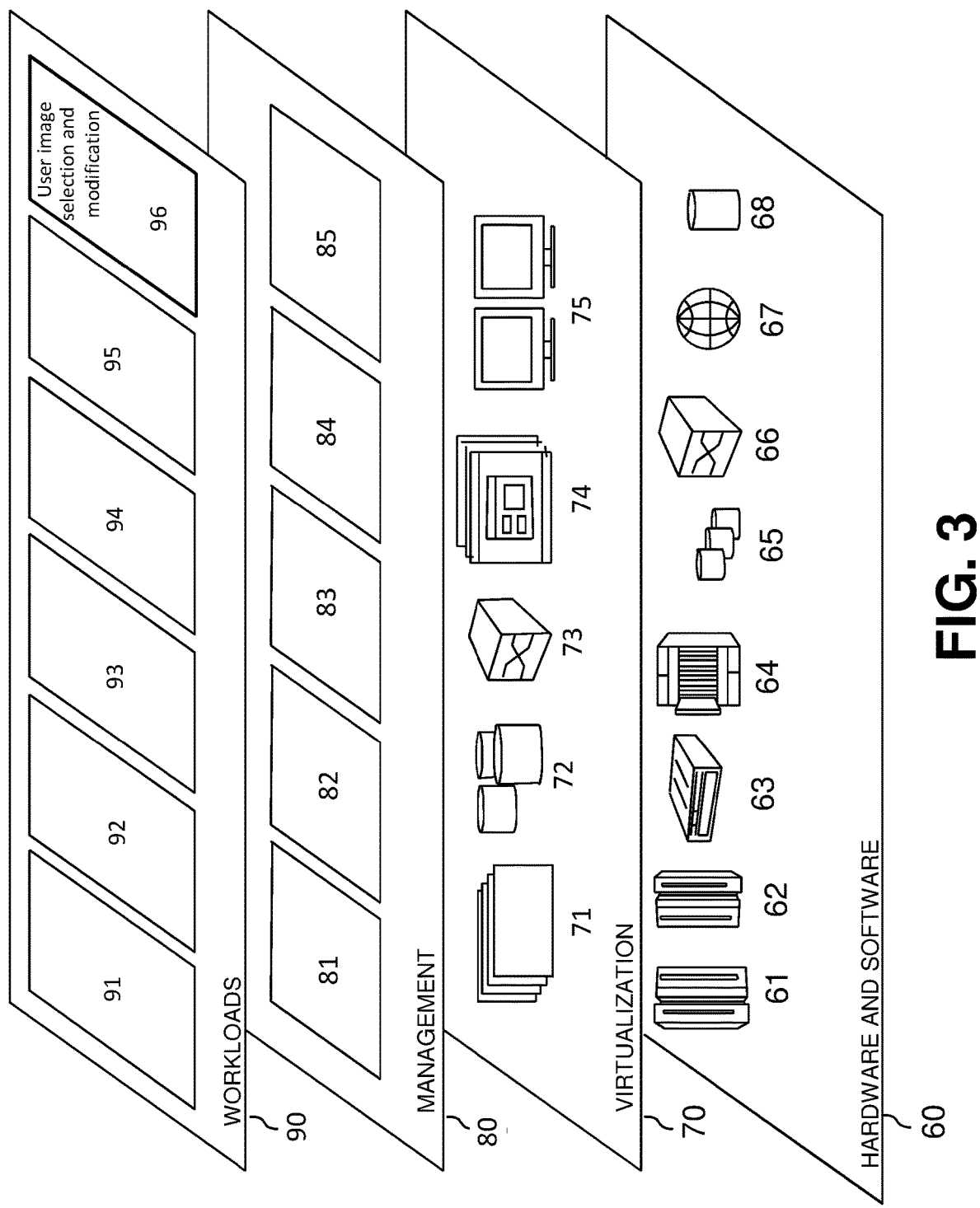
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and user image selection and modification 96.

Referring back to FIG. 1, the program/utility 40 may include one or more program modules 42 that generally carry out the functions and/or methodologies of embodiments of the invention as described herein (e.g., such as the functionality provided by user image selection and modification 96). Specifically, the program modules 42 may detect a trigger for incorporating an image based on a new social media message, determine characteristics of the message, generate an ICV object based on the characteristics, score user images based on the ICV object and user preferences, select/modify an image based on the scores, and output the selected/modified image. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of a user image control server 230 as shown in FIG. 4.

Figure 4:
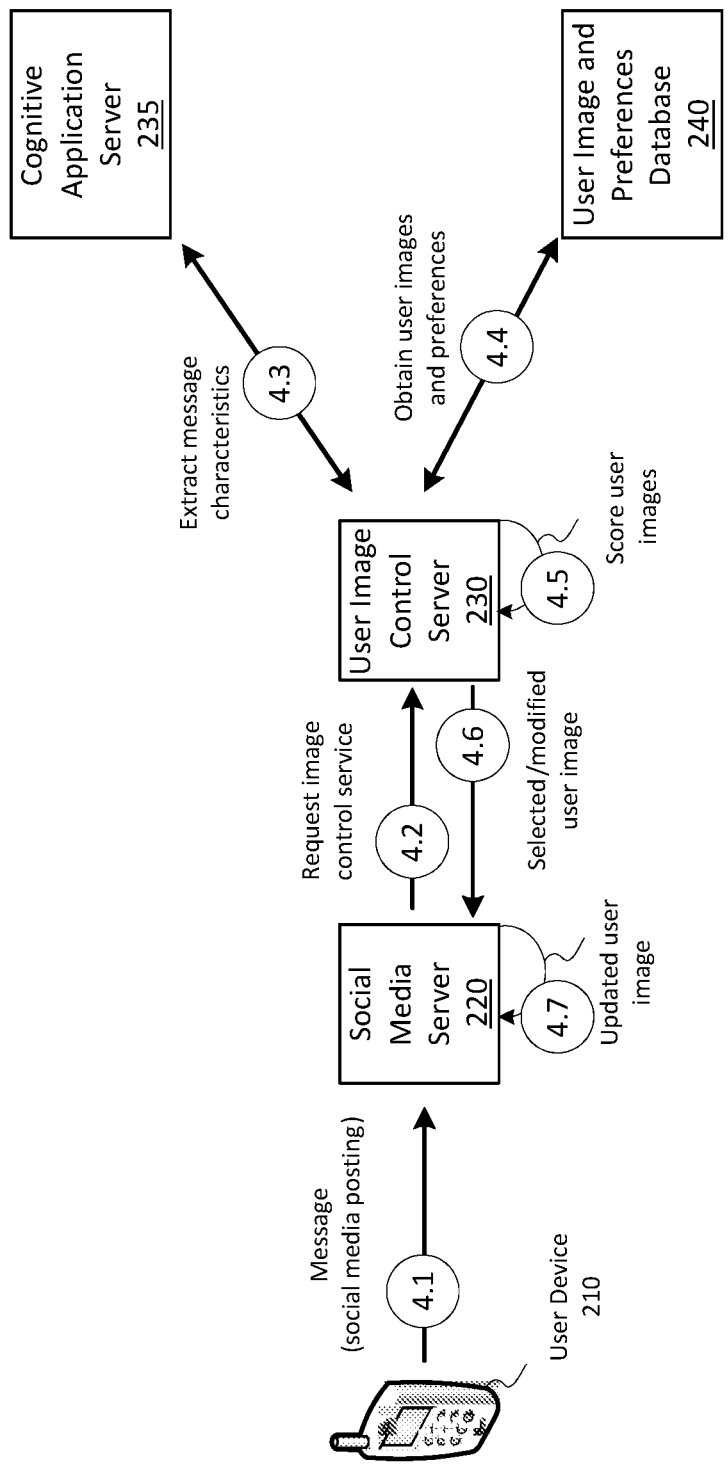
FIG. 4 shows an overview of an example implementation in accordance with aspects of the present invention

FIG. 4 shows an overview of an example implementation in accordance with aspects of the present invention. As shown FIG. 4, at step 4.1, a user may use a user device 210 to provide a message (e.g., a social media posting) to a social media server 220. Based on receiving the message, the social media server 220 may provide an image control service from a user image control server 230 (at step 4.2). The user image control server 230 may communicate with a cognitive application server 235 to extract characteristics of the message (at step 4.3). For example, the user image control server 230 may provide the message to the cognitive application server 235, and the cognitive application server 235 may extract characteristics, such as tone, personality, mood, sentiment, etc. by applying natural language processing and/or other cognitive computing techniques to the message. Additionally, or alternatively, the cognitive application server 235 may extract characteristics based on biometrics information, geolocation information, voice data, and/or other data that may be included in the message.

At step 4.4, the user image control server 230 may communicate with a user image and preferences database 240 to obtain a set of user images associated with the user and user preferences. As described herein, the user preferences may indicate the types of images that the user may wish to have selected for different messages with characteristics representing different situations, moods, sentiments, locations, etc. In embodiments, the user preferences may be used to define image characteristics that may be used to score each image. Additionally, or alternatively, image characteristics may be extracted based on cognitive analysis, object detection, and/or other technique to determine the mood/sentiment of each image.

At step 4.5, the user image control server 230 may score the user's images based on the message characteristics, image characteristics, and/or user preferences (or other criteria). For example, the user image control server 230 may generate scores in which the scores indicate a degree to which the image characteristics and/or user preferences of each image matches the message characteristics. As an example, the user image control server 230 may generate a relatively high score for an image when the image characteristics resemble a happy sentiment and when the sentiment of a post or message (e.g., from step 4.1) is also happy. In embodiments, the user image control server 230 may score an image with modifications made to the image. For example, if the message (e.g., at step 4.1) includes characteristics indicating a celebratory activity, tone, or sentiment, an image with a happy sentiment may be scored relatively high, but the same image with superimposed graphics corresponding to a celebration (e.g., confetti, fireworks, etc.) may be scored higher. In this way, the user image control server 230 may score not only images, but images with modifications (e.g., with superimposed text/graphics/emojis, embedded audio, filters, etc.).

At step 4.6, the user image control server 230 may provide a selected or modified user image (e.g., an image with the highest score) to the social media server 220. At step 4.7, the social media server 220 may update the user's image to the selected or modified image. In embodiments, the social media server 220 may update the user's profile image, or include the selected/modified image in the user's posting. Additionally, or alternatively, the selected/modified image may be incorporated for a temporary period of time before reverting back to a default image (e.g., a default or previously defined profile picture). In embodiments, user preferences for automatically updated images may be updated based on feedback received for an automatically updated image. For example, if the image was quickly changed by the user, the user preferences may be updated such that the image is scored lower in the future for automatic selection for the set of message characteristics. However, if the image was not changed and was highly rated by the user and by other users (e.g., as determined by voting, user ratings, user comments, crowdsourced data, etc.), the user preferences may be updated such that the image is scored higher in the future for automatic selection for the set of message characteristics. In embodiments, aspects of the present invention may implement a psycho-linguistics analytic module to generate psycho-linguistics personality profile of a user, based on his or her current message (or recent several messages) to find, suggest, and/or select a profile picture of a particular type. The analytics module may gather recent past social network contributions of user (also, including what the user posts and/or replies). Based on psycho-linguistics analysis, aspects of the present invention may identify recent personality profile of the user.

Figure 5:
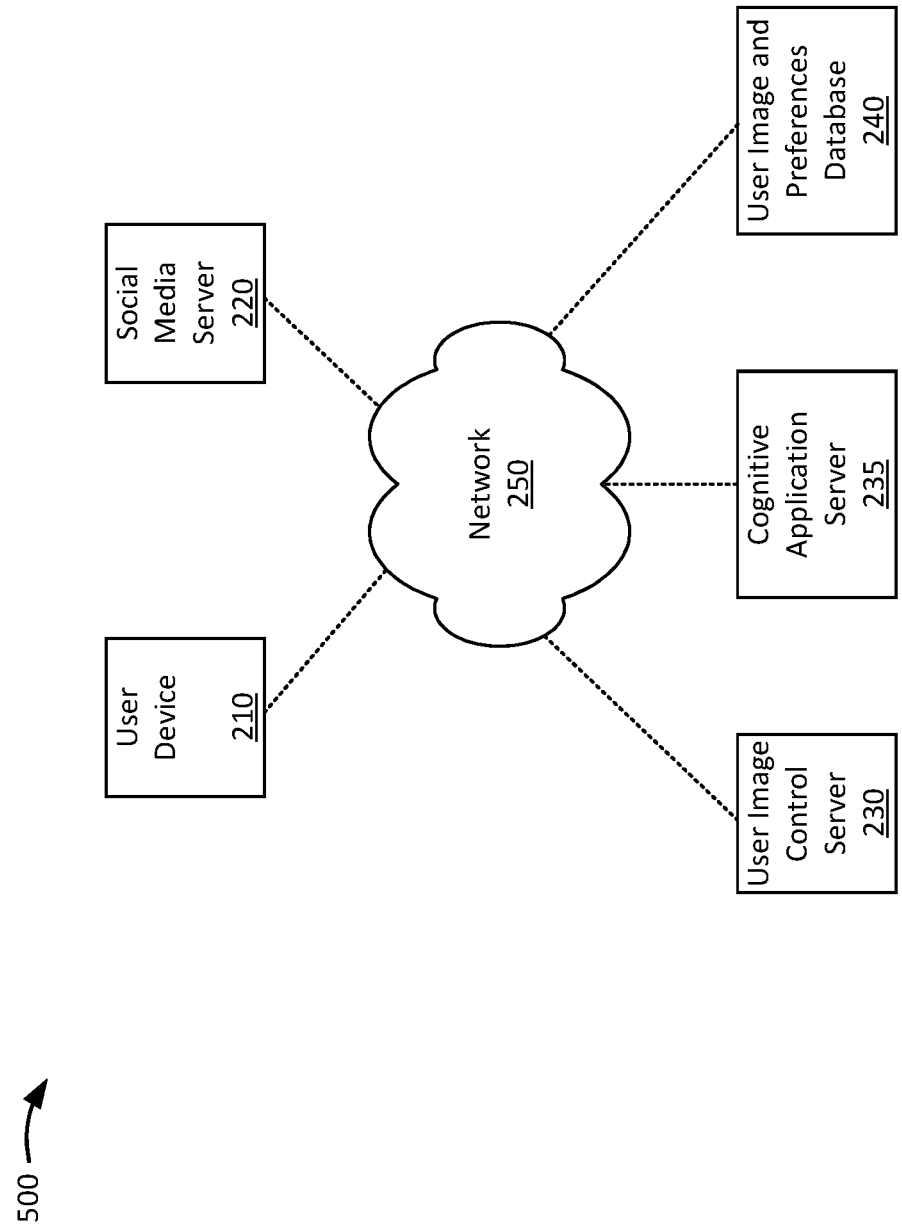
FIG. 5 shows an example environment in accordance with aspects of the present invention.

FIG. 5 shows an example environment in accordance with aspects of the present invention. As shown in FIG. 5, environment 500 may include a user device 210, a social media server 220, a user image control server 230, a cognitive application server 235, a user image and preferences database 240, and a network 250. In embodiments, one or more components in environment 500 may correspond to one or more components in the cloud computing environment of FIG. 2. In embodiments, one or more components in environment 500 may include the components of computer system/server 12 of FIG. 1.

The user device 210 may include a device capable of communicating via a network, such as the network 250. For example, the user device 210 may correspond to a mobile communication device (e.g., a smart phone or a personal digital assistant (PDA)), a portable computer device (e.g., a laptop or a tablet computer), a desktop computer, or another type of computing device. In some embodiments, the user device 210 may be used to access a social media platform hosted by the social media server 220. Further, a user may use the user device 210 to post a message to the user's social media page. In embodiments the user device 210 may include hardware for obtaining biometrics information, location information, and/or other information that may be included in the message (e.g., with the user's express permission).

The social media server 220 may include one or more computing devices (e.g., such as computer system/server 12 of FIG. 1) that hosts a social media platform. The social media server 220 may communicate with the user image control server 230 to receive updates and/or modified user images based on the characteristics of messages posted by the users (e.g., to dynamically update user images in profiles and/or posts based on the mood, sentiment, tone, etc. of the posted messages).

The user image control server 230 may include one or more computing devices (e.g., such as computer system/server 12 of FIG. 1) that receives a request to select and/or modify an image based on the characteristics of a posted message on a social media platform hosted by the social media server 220. In embodiments, the social media server 220 may select and/or modify an image based on the characteristics of a posted message by automatically monitoring posted messages, or by receiving individual requests from the social media server 220 as users post messages on the social media platform. The user image control server 230 may communicate with the cognitive application server 235 to determine characteristics of a posted message. The user image control server 230 may communicate with the user image and preferences database 240 to obtain user images and user preferences, and may score the user images as well as modifications to the user images based on the message characteristics, image characteristics, and/or user preferences.

The cognitive application server 235 may include one or more computing devices (e.g., such as computer system/server 12 of FIG. 1) that provides a cognitive application service. As described herein, the cognitive application server 235 may apply cognitive computing techniques, natural language processing techniques, biometrics analysis, and/or other techniques to extract characteristic of a message (e.g., tone, sentiment, mood, etc.).

The user image and preferences database 240 may include one or more computing devices (e.g., such as computer system/server 12 of FIG. 1) that may store user images that may be selected for replacing a current image in a user's social media profile based on the characteristics of a message posted to the user's social media account. Additionally, the user image and preferences database 240 may store user preference information that indicates the types of images that the user may wish to have selected for different situations, moods, sentiments, etc. In embodiments, the user image and preferences database 240 may be incorporated into the social media server 220.

The network 250 may include network nodes, such as network nodes 10 of FIG. 2. Additionally, or alternatively, the network 250 may include one or more wired and/or wireless networks. For example, the network 250 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 250 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in the environment 500 is not limited to what is shown in FIG. 5. In practice, the environment 500 may include additional devices and/or networks; fewer devices and/or networks; different devices and/or networks; or differently arranged devices and/or networks than illustrated in FIG. 5. Also, in some implementations, one or more of the devices of the environment 500 may perform one or more functions described as being performed by another one or more of the devices of the environment 500. Devices of the environment 500 may interconnect via wired connections, wireless connections, or a combination of wired and wireless connections.

Figure 6:
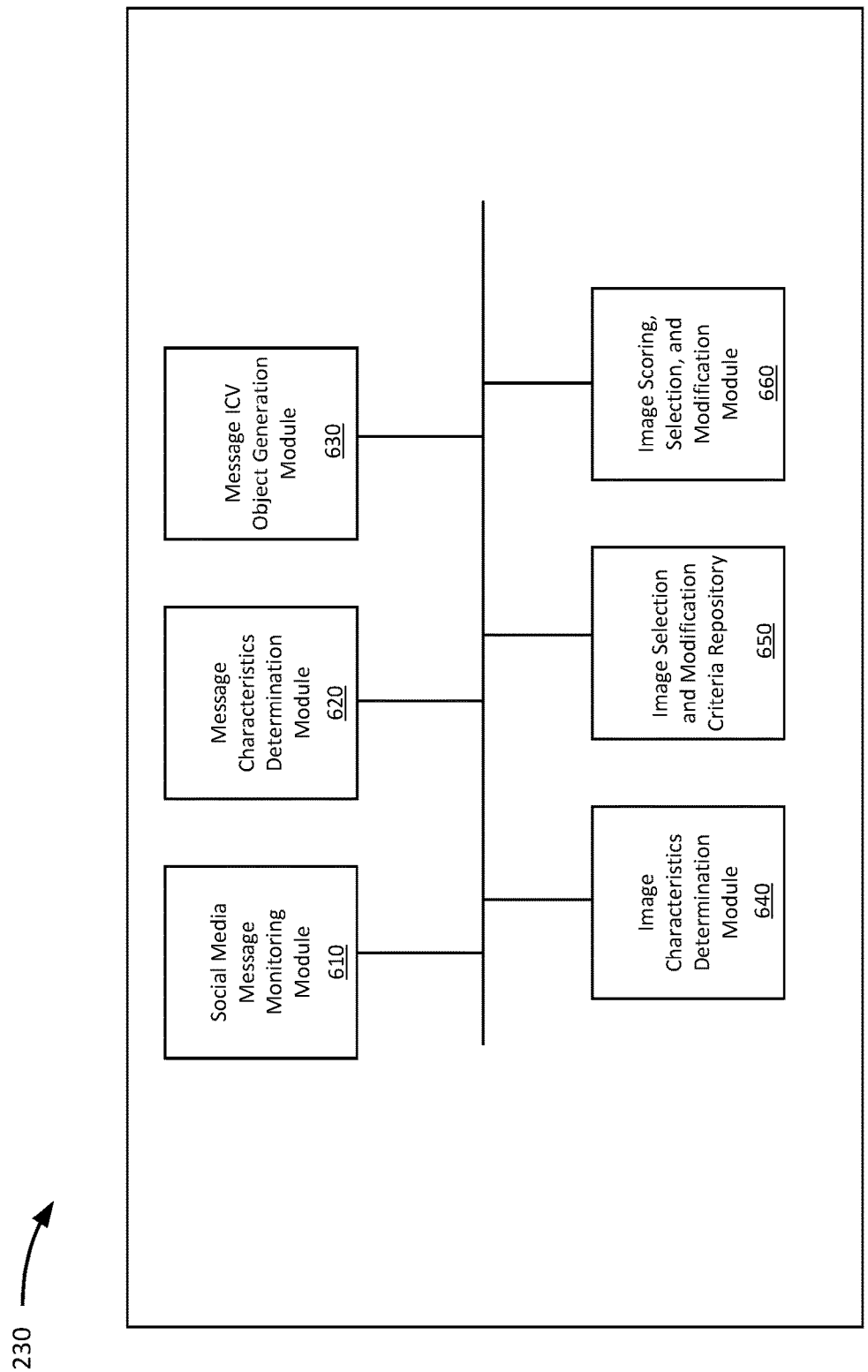
FIG. 6 shows a block diagram of example components of a user image control server in accordance with aspects of the present invention.

FIG. 6 shows a block diagram of example components of a user image control server 230 in accordance with aspects of the present invention. As shown in FIG. 6, the user image control server 230 may include a social media message monitoring module 610, a message characteristics determination module 620, a message ICV object generation module 630, a image characteristics determination module 640, a image selection and modification criteria repository 650, and an image scoring, selection, and modification module 660. In embodiments, the user image control server 230 may include additional or fewer components than those shown in FIG. 6. In embodiments, separate components may be integrated into a single computing component or module. Additionally, or alternatively, a single component may be implemented as multiple computing components or modules.

The social media message monitoring module 610 may include a program module (e.g., program module 42 of FIG. 1) that monitors social media messages posted to a user's social media page. For example, the social media message monitoring module 610 may monitor the posted messages using an application programming interface (API) that communicates with a social media application hosted by the social media server 220. The social media message monitoring module 610 may monitor the messages using social media credentials received by the user and with the user's express permission to allow the social media message monitoring module 610 to monitor the user's social media posts. As described herein, the message may include text, an image, a video, and embedded metadata, such as biometrics information of the user at the time the message was posted, location information associated with the message, etc. The message may include a reply to another message, or a new message. In embodiments, the posted message may be from a user, a group of users (e.g., an aggregate entity or team), and/or an artificial intelligence (AI) agent.

The message characteristics determination module 620 may include a program module (e.g., program module 42 of FIG. 1) that determines message characteristics for a message posted on the user's social media page. In embodiments, the message characteristics determination module 620 may communicate with the cognitive application server 235 (e.g., using API calls), or may incorporate functions of the cognitive application server 235 to determine message characteristics. As described herein, message characteristics may include information such as tone, personality, mood, sentiment, emotional state, etc. The message characteristics may be determined using natural language processing, image analysis techniques (e.g., to determine facial expressions, lighting, etc.), biometrics analysis, and/or other cognitive computing techniques. In embodiments, the message characteristics may be in the form of a value or score indicating a confidence or degree of the characteristic (e.g., a "happiness" score of 80%, an "openess" score of 40%, etc.). In embodiments, the message characteristics determination module 620 may obtain characteristics for a message from external sources, such as an independent news feed to determine context relating to posted message in which the context may be used to help determine the tone, sentiment, etc. of the posted message.

The message ICV object generation module 630 may include a program module (e.g., program module 42 of FIG. 1) that generates an image control variable (ICV) object. As described herein, an ICV object may include a data object that stores characteristics data associated with the message. As described herein, the ICV object may be used to score candidate images or modifications based on image characteristics and image selection and modification criteria. In embodiments, the ICV object may be a multidimensional structure (MS) with characteristics, context and user profile as dimensions.

The image characteristics determination module 640 may include a program module (e.g., program module 42 of FIG. 1) that determines characteristics of images (e.g., candidate images for a user that may be selected to incorporate based on the characteristics of a message). In embodiments, the image characteristics determination module 640 may access user images from the user image and preferences database 240, and may determine image characteristics in a similar manner as determining message characteristics (e.g., by communicating with the cognitive application server 235 to apply image analysis to determine, within each image, facial expressions, locations, objects, etc., that may indicate mood, sentiment, tone, personality, etc. of each image).

The image selection and modification criteria repository 650 may include a storage system (e.g., storage system 34 of FIG. 1) that stores image selection and modification criteria. In embodiments, the image selection and modification criteria may include weighted criteria that may be used to score candidate images to incorporate. Additionally, or alternatively, the image selection and modification criteria may include user preferences that may indicate the types of images that the user may wish to have selected for different messages with characteristics representing different situations, moods, sentiments, locations, etc. Additionally, or alternatively, the image selection and modification criteria may include criteria that is learned based on the nature, tone, and content of a message along with historical location-dependent context information, users' viewing or browsing history, social medial history. New criteria can be presented to the user on a GUI and/or added to a user's preferences settings stored by the image selection and modification criteria repository 650. As an illustrative, non-limiting example, in case of an internal organization application or and social media account for an organization, criteria of the types of images to include in a social media profile could be established, in order to maintain an image (e.g. in case of an ICV object for a message related to sad text, the criteria may indicate that sad expressions images should be avoided and neutral expression images should be used instead). In embodiments, user preferences and/or image selection criteria may include criteria indicating how often a user profile image should be modified or changed.

Rules for an ICV object may be retrieved from the image selection and modification criteria repository 650 and applied to MS. Rules may be stored for each of the dimensions and contains thresholds for default characteristics that may be used to identify/select a new profile image or its transformation. An updated MS may be created for which the weighted factor are the ICV, which will be used to select the new image and any transformations/modifications.

The image scoring, selection, and modification module 660 may include a program module (e.g., program module 42 of FIG. 1) that scores user images based on the message characteristics, image characteristics, and/or image selection and modification criteria. As an example, the image scoring, selection, and modification module 660 may generate a relatively high score for an image when the image characteristics resemble a happy sentiment, when the sentiment of a post or message is also happy, and when the criteria indicates that the type of image to be selected for a happy sentiment is an image that also has a happy sentiment. In embodiments, the image scoring, selection, and modification module 660 may generate a score for an image that is not of the user, rather of an object or avatar that is appropriate for the sentiment of a posted message.

In embodiments, the image scoring, selection, and modification module 660 may score an image with modifications made to the image. For example, if the message includes characteristics (as determined by the message characteristics determination module 620) indicating a celebratory activity, tone, or sentiment, an image with a happy sentiment may be scored relatively high, but the same image with superimposed graphics corresponding to a celebration (e.g., confetti, fireworks, etc.) may be scored higher. In this way, the image scoring, selection, and modification module 660 may score not only images, but images with modifications (e.g., with superimposed text/graphics/emojis/logos, warning messages, embedded audio, filters, cropped sections, modified backgrounds, special effects, a collage of multiple different images, etc.). In embodiments, the image scoring, selection, and modification module 660 may score images based on context, including, for example, estimation of the cohort of one or more viewers of the profile photo, time of day, nature of viewing device, and/or user cohort (e.g., demographics, culture, interests, etc.).

In embodiments, the image scoring, selection, and modification module 660 may select a user image in a repository, modify a selected image, or modify an existing image (e.g., an existing profile image) based on the scores. For example, the image scoring, selection, and modification module 660 may select the highest scored option (e.g., a highest scored image, a highest scored modification to an image in a repository of user images, or highest scored modification to an existing image). In embodiments, the image scoring, selection, and modification module 660 may select or modify a user image based on crowdsourced data (e.g., user ratings, voting results of a group of candidate images, etc.). In embodiments, the image scoring, selection, and modification module 660 may select or modify a user image based on an estimation of the preferences or interest of a group of users viewing the user's profile image. Additionally, or alternatively, the image scoring, selection, and modification module 660 may select or modify a user image based on other factors, such as time of day, nature of viewing device, etc. The image scoring, selection, and modification module 660 may output the selected image, modified image, or modification to existing image for positing on the user's social media page.

Figure 7:
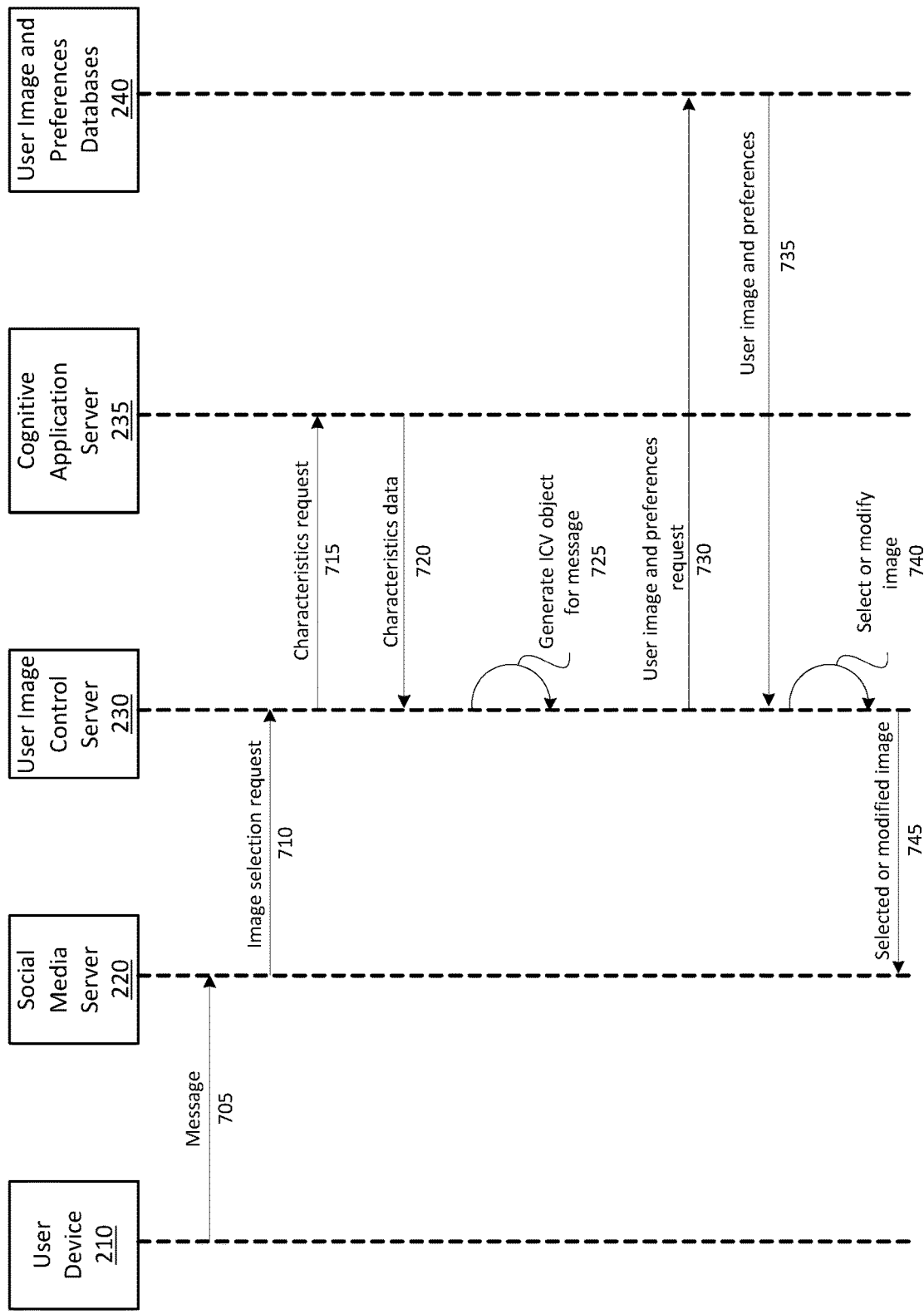
FIG. 7 shows an example call flow diagram for modifying or replacing a user image based on the characteristics of a posted message in accordance with aspects of the present invention.

FIG. 7 shows an example call flow diagram for modifying or replacing a user image based on the characteristics of a posted message. The steps of FIG. 7 may be implemented in the environment of FIG. 5, for example, and are described using reference numbers of elements depicted in FIG. 5. As noted above, the call flow diagram illustrates the architecture, functionality, and operation of possible implementations of systems, methods, and computer program products according to various embodiments of the present invention.

As shown in FIG. 7, a user device 210 may provide a message to the social media server 220 (step 705). For example, a user of user device 210 may compose a message via a social media application. In embodiments, the message may include text, an image, audio, video, and/or metadata (e.g., location information, biometrics information, etc.). The social media server 220 may receive the message for posting on to the user's social media page.

At step 710, the social media server 220 may provide, to the user image control server 230, an image selection request. The request may include the message and/or the message metadata. The social media server 220 may provide the image selection request to request the user image control server 230 to select an image (or modify an existing image) based on the characteristics of the message. At step 715, the user image control server 230 may provide a characteristics request to the cognitive application server 235. The characteristics request may include a request for the cognitive application server 235 to determine characteristics of the message (e.g., tone, personality, mood, sentiment, etc.). As described herein, the cognitive application server 235 may extract the characteristics from the message and/or the message metadata by applying natural language processing and/or other cognitive computing techniques to the message (e.g., biometrics analysis, voice analysis, geographic location analysis, image analysis, etc.).

At step 720, the cognitive application server 235 may provide characteristics data to the user image control server 230 in which the characteristics data identifies the characteristics of the message (e.g., tone, personality, mood, sentiment, etc.). In embodiments, the characteristics data may be in any variety of structured formats, and include quantitative and/or qualitative values that represent the characteristics of the message. At step 725, the user image control server 230 may generate an ICV object for the message. As described herein, the ICV object may include a data object that stores the characteristics data.

At step 730, the user image control server 230 may request user images and preferences from the user image and preferences database 240. At step 735, the user image and preferences database 240 may provide user images (e.g., from which a particular user image may be selected), and user preferences that may be used as part of image selection/modification criteria. At step 740, the user image control server 230 may select or modify an image (e.g., in the manner discussed above with respect to the image scoring, selection, and modification module 660). At step 745, the user image control server 230 may provide the selected or modified image to the social media server 220 for posting. The social media server 220 may post the image until changed by the user, until another message has been posted by the user, or for a set temporary period of time. In embodiments, the social media server 220 may post the image and replace a previous image (e.g., a prior profile image).

Figure 8:
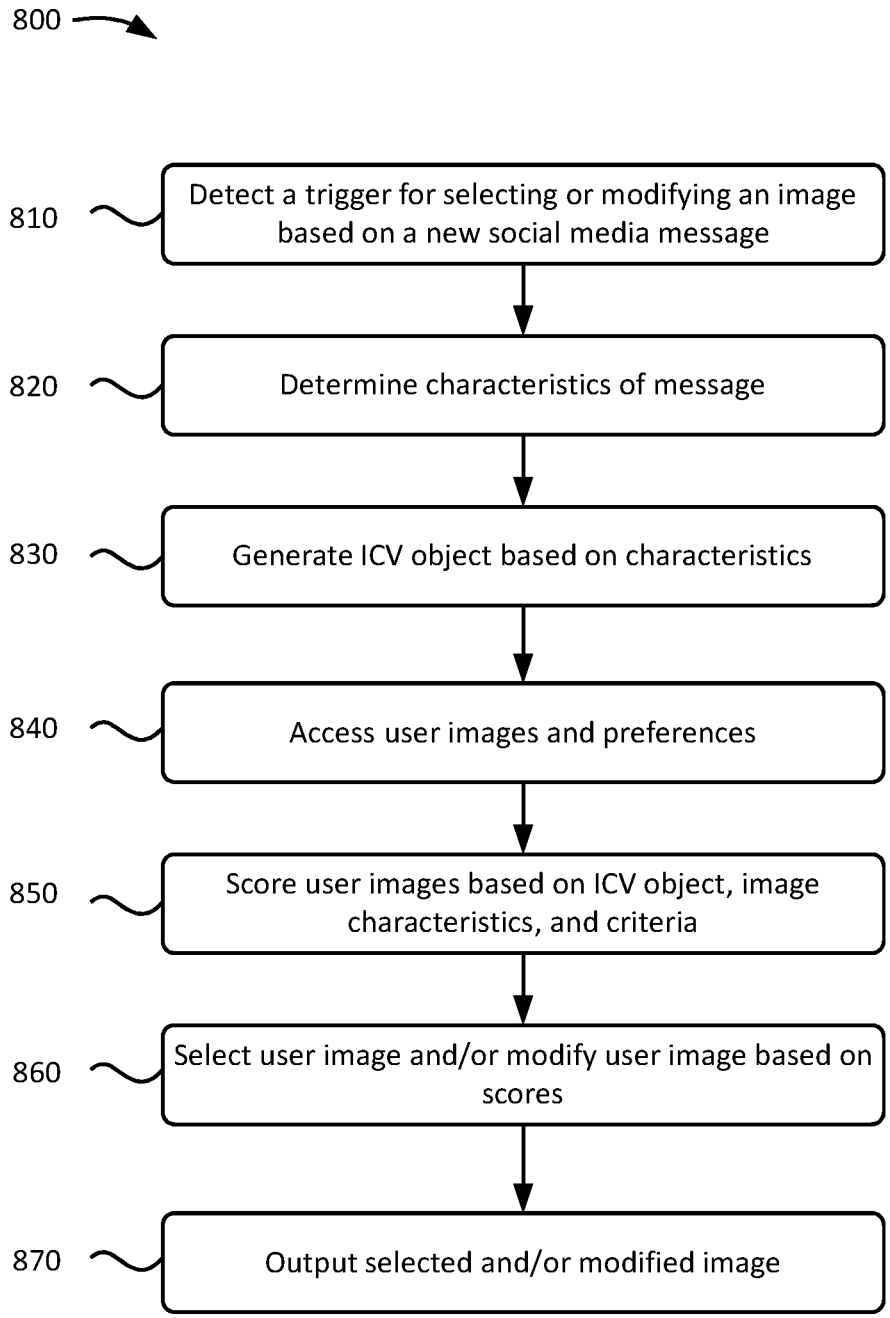
FIG. 8 shows an example flowchart of a process for changing an image in a user's social media page or profile based on the characteristics of a message posted by the user in accordance with aspects of the present invention.

FIG. 8 shows an example flowchart of a process for changing an image in a user's social media page or profile based on the characteristics of a message posted by the user. The steps of FIG. 8 may be implemented in the environment of FIG. 5, for example, and are described using reference numbers of elements depicted in FIG. 5. As noted above, the flowchart illustrates the architecture, functionality, and operation of possible implementations of systems, methods, and computer program products according to various embodiments of the present invention.

As shown in FIG. 8, process 800 may include detecting a trigger for selecting or modifying an image based on a new social media message (step 810). For example, the user image control server 230 may detect a trigger for selecting or modifying an image in a user's social media profile by receiving a request from the social media server 220 (e.g., when a user posts a new message) or by monitoring the user's social media page and detecting that the user has posted a new message (e.g., using the social media message monitoring module 610).

Process 800 may also include determining the characteristics of the message (step 820). For example, as described above with respect to the message characteristics determination module 620, the user image control server 230 may determine message characteristics for a message posted on the user's social media page. In embodiments, the user image control server 230 may communicate with the cognitive application server 235 (e.g., using API calls), or may incorporate functions of the cognitive application server 235 to determine message characteristics. As described herein, message characteristics may include information such as tone, personality, mood, sentiment, emotional state, etc. The message characteristics may be determined using natural language processing, image analysis techniques (e.g., to determine facial expressions, lighting, etc.), biometrics analysis, and/or other cognitive computing techniques.

Process 800 may further include generating an ICV object based on the characteristics (step 830). For example, as described above with respect to the message ICV object generation module 630, the user image control server 230 may generate the ICV object. As described herein, an ICV object may include a data object that stores characteristics data associated with the message. As described herein, the ICV object may be used to score candidate images or modifications based on image characteristics and image selection and modification criteria.

Process 800 may also include accessing user images and preferences (step 840). For example, as described above with respect to the image characteristics determination module 640 and the image selection and modification criteria repository 650, the user image control server 230 may access user images and preferences by communicating with the user image and preferences database 240. The user image control server 230 may further determine image characteristics in a similar manner as determining message characteristics (e.g., by communicating with the cognitive application server 235 to apply image analysis to determine, within each image, facial expressions, locations, objects, etc., that may indicate mood, sentiment, tone, personality, etc. of each image).

Process 800 may further include scoring the user image based on the ICV object, image characteristics, and criteria (step 850). For example, as described above with respect to the image scoring, selection, and modification module 660, the user image control server 230 may scores user images based on the message characteristics, image characteristics, and/or image selection and modification criteria (stored by the image selection and modification criteria repository 650). In embodiments, the user image control server 230 may score an image with modifications made to the image. For example, if the message includes characteristics (as determined by the message characteristics determination module 620) indicating a celebratory activity, tone, or sentiment, an image with a happy sentiment may be scored relatively high, but the same image with superimposed graphics corresponding to a celebration (e.g., confetti, fireworks, etc.) may be scored higher. In this way, the user image control server 230 may score not only images, but images with modifications (e.g., with superimposed text/graphics/emojis, embedded audio, filters, cropped sections, modified backgrounds, special effects, a collage of multiple different images, etc.).

Process 800 may also include selecting a user image and/or modify a user image based on the scores (step 860) and outputting the selected and/or modified image (step 870). For example, as described above with respect to the image scoring, selection, and modification module 660, the user image control server 230 may select a user image in a repository, modify a selected image, or modify an existing image (e.g., an existing profile image by altering the image or selecting a new image) based on the scores. In embodiments, the user image control server 230 may select the highest scored option (e.g., a highest scored image, a highest scored modification to an image in a repository of user images, or highest scored modification to an existing image. The user image control server 230 may output the selected image, modified image, or modification to existing image for positing on the user's social media page.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    determining, by a computing device, characteristics of a social media message using natural language processing;
    selecting, by the computing device, a particular image, of a plurality of images, based on the characteristics of the social media message, characteristics of the particular image, and stored user preferences indicating types of images to be selected in response to particular social media message characteristics; and
    outputting, by the computing device, information identifying the selected image to incorporate the selected image in a user's social media profile.

2. The method of claim 1, further comprising detecting a trigger for selecting a new image, wherein the determining the characteristics of the social media message is based on detecting the trigger.

3. The method of claim 2, wherein the detecting the trigger comprises at least one selected from the group consisting of:
    receiving a request to select the new image from a social media server when the user posts the social media message; and monitoring the user social media profile and determining that the user has posted the social media message.

4. The method of claim 1, wherein the determining the characteristics of the social media message further comprises determining the characteristics based on at least one selected from the group consisting of:
- biometrics information;
- geographic location information;
- voice analysis;
- image analysis; and
- context analysis from an external source.

5. The method of claim 1, wherein the characteristics of the social media message comprises at least one selected from the group consisting of:
- tone;
- personality;
- mood;
- sentiment; and
- location.

6. The method of claim 1, further comprising modifying the selected image prior to outputting the selected image.

7. The method of claim 6, wherein the modifying the image selected image comprises at least one selected from the group consisting of:
- applying an image filter to the selected image;
- applying special effects to the selected image;
- superimposing a graphic to the selected image;
- superimposing text to the selected image;
- cropping the selected image;
- incorporating the selected image into a collage of another image; and
- modifying objects within the selected image.

8. The method of claim 1, further comprising:
- generating an image control variance (ICV) object storing the characteristics of the social media message; and
- scoring the plurality of images using the ICV object, wherein the selected image has a highest score among the plurality of images.

9. The method of claim 8, wherein scoring the plurality of images further comprises scoring the plurality of images with modifications made to the plurality of images.

10. The method of claim 1, wherein a service provider at least one of creates, maintains, deploys and supports the computing device.

11. The method of claim 1, wherein the determining the characteristics, the selecting the particular image, and the outputting the information identifying the selected image are provided by a service provider on a subscription, advertising, or fee basis.

12. The method of claim 1, wherein the computing device includes software provided as a service in a cloud environment.

13. The method of claim 1, further comprising deploying a system for dynamically updating the user's social medial profile based on the characteristics of the social media message, comprising providing a computer infrastructure operable to perform the determining the characteristics, the selecting the particular image, and the outputting the information identifying the selected image.

14. A computer program product for dynamically updating a user's social media profile based on characteristics of a newly posted social media message on the user's social media profile, the computer program product comprising a computer readable storage medium having program instructions embodied therewith, the program instructions executable by a computing device to cause the computing device to:
- obtain characteristics of the newly posted social media message via one or more cognitive computing techniques including natural language processing;
- obtain respective characteristics of a plurality of images associated with the user;
- score each of the plurality of images by comparing the respective characteristics of each of the plurality of images with the characteristics of the newly posted social media message and based on stored user preferences indicating types of images to be selected in response to particular social media message characteristics;
- select a particular image, of the plurality of images, based on the scoring; and
- output information identifying the selected image to incorporate the selected image in the user's social media profile.

15. The computer program product of claim 14, wherein the program instructions further cause the computing device to obtain the characteristics based on at least one selected from the group consisting of:
- biometrics information;
- geographic location information;
- voice analysis;
- image analysis; and
- context analysis from an external source.

16. The computer program product of claim 14, wherein the characteristics of the social media message comprises at least one selected from the group consisting of:
- tone;
- personality;
- mood;
- sentiment; and
- location.

17. The computer program product of claim 14, wherein the program instructions further cause the computing device to:
- modify each of the plurality of images; and
- score modified versions of the plurality of images, wherein the selecting the particular image comprises selecting a modified version of the particular image, and
- wherein the modifying each of the plurality of images comprises at least one selected from the group consisting of:
  - applying an image filter;
  - applying special effects;
  - superimposing a graphic;
  - superimposing text;
  - cropping;
  - incorporating into a collage; and
  - modifying objects.

18. A system comprising:
- a CPU, a computer readable memory and a computer readable storage medium associated with a computing device;
- program instructions to detect a trigger for incorporating an image in a user's social media profile based on a social media message posted to the user's social media profile;
- program instructions to determine characteristics of the social media message using natural language processing;
- program instructions to score each of a plurality of images associated with the user by comparing respective characteristics of each of the plurality of images with the characteristics of the social media message and based on stored user preferences indicating types of images to be selected in response to particular social media message characteristics;

program instructions to select a particular image, of the plurality of images, based on the scoring; and program instructions to output information identifying the selected image to incorporate the selected image in the user's social media profile, wherein the program instructions are stored on the computer readable storage medium for execution by the CPU via the computer readable memory.

19. The method of claim 8, further comprising, in response to the user changing the selected image, updating the stored user preferences such that the selected image is scored lower with respect to the characteristics.

20. The method of claim 8, further comprising, in response to the user positively rating the selected image, updating the stored user preferences such that the selected image is scored higher with respect to the characteristics.

* * * * *